(12) United States Patent
Yang et al.

(10) Patent No.: US 11,314,451 B2
(45) Date of Patent: Apr. 26, 2022

(54) METHOD AND APPARATUS FOR STORING DATA (71) Applicant: Beijing Baidu Netcom Science and Technology Co., Ltd., Beijing (CN)

(72) Inventors: Ping Yang, Beijing (CN); Wen Zhao, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 74 days.

(21) Appl. No.: 16/565,418

(22) Filed: Sep. 9, 2019

(65) Prior Publication Data

US 2020/0004464 A1    Jan. 2, 2020

(30) Foreign Application Priority Data

Nov. 22, 2018 (CN) .......................... 201811397163.2

(51) Int. Cl.
*G06F 3/06* (2006.01)

(52) U.S. Cl.
CPC ............ *G06F 3/0659* (2013.01); *G06F 3/061* (2013.01); *G06F 3/0604* (2013.01); *G06F 3/0673* (2013.01)

(58) Field of Classification Search
None
See application file for complete search history.

(56) References Cited

U.S. PATENT DOCUMENTS

| 6,317,808 | B1 * | 11/2001 | Berenshteyn | G06F 3/0607 |
| | | | | 710/39 |
| 2006/0259274 | A1 * | 11/2006 | Greco | G06F 11/3409 |
| | | | | 702/182 |
| 2009/0271485 | A1 * | 10/2009 | Sawyer | G06F 3/061 |
| | | | | 709/206 |
| 2017/0161184 | A1 * | 6/2017 | Colgrove | G06F 3/0683 |
| 2018/0352023 | A1 * | 12/2018 | Jujjuri | G06F 9/5083 |
| 2019/0005065 | A1 * | 1/2019 | Debnath | G06F 16/183 |
| 2019/0042089 | A1 * | 2/2019 | Chagam Reddy | G06F 3/0631 |
| 2019/0079686 | A1 * | 3/2019 | Gupta | G06F 3/0689 |

FOREIGN PATENT DOCUMENTS

| CN | 107948229 A | 4/2018 |
| CN | 108196791 A | 6/2018 |

* cited by examiner

*Primary Examiner* — Kaushikkumar M Patel
(74) *Attorney, Agent, or Firm* — Kilpatrick Townsend & Stockton LLP (57) ABSTRACT

A method and apparatus for storing data are provided. A specific implementation of the method for storing data includes: receiving a storage request including to-be-stored data; acquiring, for a to-be-written node in a to-be-written node group, a memory performance information set corresponding to at least one memory included in the to-be-written node, and generating a weight value of the to-be-written node based on the acquired memory performance information set; determining, based on a generated weight value set, a target to-be-written node from the to-be-written node group; and storing the to-be-stored data to the target to-be-written node.

7 Claims, 5 Drawing Sheets

METHOD AND APPARATUS FOR STORING DATA

CROSS-REFERENCE TO RELATED APPLICATIONS

This application claims priority to Chinese Application No. 201811397163.2, filed on Nov. 22, 2018 and entitled "Method and Apparatus for Storing Data," the entire disclosure of which is hereby incorporated by reference.

TECHNICAL FIELD

Embodiments of the present disclosure relate to the field of computer technology, specifically to the field of Internet technology, and more specifically to a method and apparatus for storing data.

BACKGROUND

Distributed storage systems store data discretely across a plurality of independent devices. A conventional network storage system generally uses a centralized storage server to store all the data. The storage server becomes the bottleneck of system performance and is also the focus of reliability and security, which cannot meet the requirements of large-scale storage applications. A distributed network storage system adopts an expandable system architecture, uses a plurality of storage servers to share the storage load, and uses a location server to locate storage information, which not only improves system reliability, availability and access efficiency, but also is easy to expand.

SUMMARY

Embodiments of the present disclosure propose a method and apparatus for storing data.

In a first aspect, an embodiment of the present disclosure provides a method for storing data, including: receiving a storage request including to-be-stored data; acquiring, for a to-be-written node in a to-be-written node group, a memory performance information set corresponding to at least one memory included in the to-be-written node, and generating a weight value of the to-be-written node based on the acquired memory performance information set; determining, based on a generated weight value set, a target to-be-written node from the to-be-written node group; and storing the to-be-stored data to the target to-be-written node.

In some embodiments, the generating a weight value of the to-be-written node based on the acquired memory performance information set, includes: determining a remaining storage space level value and a read/write speed level value of the to-be-written node based on the acquired memory performance information set; and generating the weight value of the to-be-written node based on the determined remaining storage space level value and the read/write speed level value.

In some embodiments, the generating the weight value of the to-be-written node based on the determined remaining storage space level value and the read/write speed level value, includes: generating the weight value of the to-be-written node based on the determined remaining storage space level value and the read/write speed level value, and a preset weight value of the remaining storage space level value and a preset weight value of the read/write speed level value of the to-be-written node.

In some embodiments, memory performance information includes at least one of: a remaining storage space size of the memory, a read/write speed of the memory, a rotating speed of the memory, or seek time.

In some embodiments, the determining, based on a generated weight value set, a target to-be-written node from the to-be-written node group, includes: sorting weight values in the generated weight value set in a descending order to generate a weight value sequence, where the weight values in the weight value set have one-to-one corresponding relationships with to-be-written nodes in the to-be-written node group; grading, for the weight values in the generated weight value sequence, according to a set level spacing, the weight values to obtain level values corresponding to the weight values; and determining the target to-be-written node from the to-be-written node group based on the obtained level values.

In a second aspect, an embodiment of the present disclosure provides an apparatus for storing data, including: a receiving unit, configured to receive a storage request including to-be-stored data; an acquisition unit, configured to acquire, for a to-be-written node in a to-be-written node group, a memory performance information set corresponding to at least one memory included in the to-be-written node, and generate a weight value of the to-be-written node based on the acquired memory performance information set; a determining unit, configured to determine, based on a generated weight value set, a target to-be-written node from the to-be-written node group; and a storing unit, configured to store the to-be-stored data to the target to-be-written node.

In some embodiments, the generating a weight value of the to-be-written node based on the acquired memory performance information set, includes: determining a remaining storage space level value and a read/write speed level value of the to-be-written node based on the acquired memory performance information set; and generating the weight value of the to-be-written node based on the determined remaining storage space level value and the read/write speed level value.

In some embodiments, the generating the weight value of the to-be-written node based on the determined remaining storage space level value and the read/write speed level value, includes: generating the weight value of the to-be-written node based on the determined remaining storage space level value and the read/write speed level value, and a preset weight value of the remaining storage space level value and a preset weight value of the read/write speed level value of the to-be-written node.

In some embodiments, memory performance information includes at least one of: a remaining storage space size of the memory, a read/write speed of the memory, a rotating speed of the memory, or seek time.

In some embodiments, the determining, based on a generated weight value set, a target to-be-written node from the to-be-written node group, includes: sorting weight values in the generated weight value set in a descending order to generate a weight value sequence, where the weight values in the weight value set have one-to-one corresponding relationships with to-be-written nodes in the to-be-written node group; grading, for the weight values in the generated weight value sequence, according to a set level spacing, the weight values to obtain level values corresponding to the weight values; and determining the target to-be-written node from the to-be-written node group based on the obtained level values.

In a third aspect, an embodiment of the present disclosure provides a server, including: one or more processors; and a storage apparatus, storing one or more programs thereon, the one or more programs, when executed by the one or more processors, cause the one or more processors to implement the method for storing data according to any one of some embodiments in the first aspect.

In a fourth aspect, an embodiment of the present disclosure provides a computer readable medium, storing a computer program thereon, the program, when executed by a processor, implements the method for storing data according to any one of some embodiments in the first aspect.

The method and apparatus for storing data provided by some embodiments of the present disclosure first receive a storage request including to-be-stored data, then acquire, for a to-be-written node in a to-be-written node group, a memory performance information set corresponding to at least one memory included in the to-be-written node, and generate a weight value of the to-be-written node based on the acquired memory performance information set. Thus, the weight value of the node may be determined by memory performance information. Then, a target to-be-written node is determined from the to-be-written node group based on a generated weight value set. Here, the node is selected based on the weight value, and the node with better memory performance may be selected, thereby improving the utilization of the node and reducing the read/write delay of the node. Finally, the to-be-stored data is stored to the target to-be-written node. Storing data by selecting the node based on the weight value may store the data to an appropriate node, so that the capacity of the data node is more balanced. This apparatus may improve the flexibility of data storage.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of present disclosure will be further described below in detail in combination with the accompanying drawings. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
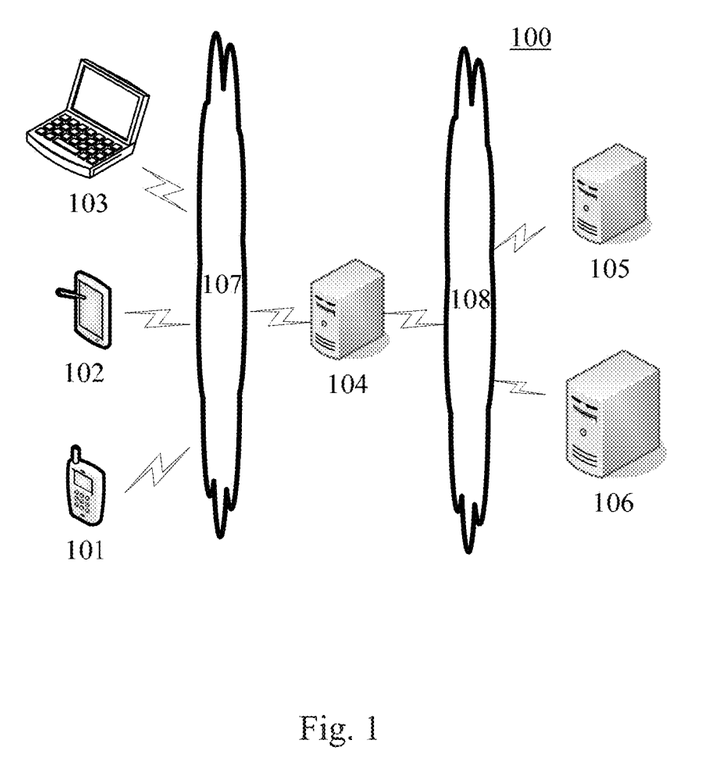
FIG. 1 is a diagram of an example system architecture in which an embodiment of the present disclosure may be implemented.

FIG. 1 illustrates an example system architecture 100 in which a method for storing data or an apparatus for storing data to which some embodiments of the present disclosure may be implemented.

As shown in FIG. 1, the system architecture 100 may include terminal devices 101, 102, 103, a control server 104, and node servers 105, 106. The network 107 serves as a medium providing a communication link between the terminal devices 101, 102, 103 and the control server 104, and the network 108 serves as a medium providing a communication link between the control server 104 and the node servers 105, 106. The networks 107, 108 may include various types of connections, such as wired or wireless communication links, or optic fibers.

The terminal devices 101, 102, 103 interact with the control server 104 to receive or send messages, store various data, or the like. Various applications such as shopping applications, search applications, instant communication tools, mailbox terminals, social platform software, text editing applications, browser applications, or reading applications may be installed on the terminal devices 101, 102, and 103.

The terminal devices 101, 102, 103 may be hardware or software. When the terminal devices 101, 102, 103 are hardware, the terminal devices 101, 102, 103 may be various electronic devices including, but not limited to, smartphones, tablets, e-book readers, laptop portable computers, desktop computers, or the like. When the terminal devices 101, 102, 103 are software, the terminal devices 101, 102, 103 may be installed in the above-listed electronic devices. The terminal devices 101, 102, 103 may be implemented as a plurality of software or software modules (for example, for providing distributed services) or as a single software or software module, which is not specifically limited herein.

The node servers 105, 106 may be servers that provide various services, for example, servers that provide storage services for shopping data generated by the shopping applications on the terminal devices 101, 102, 103. The node servers 105, 106 may store the shopping data when receiving the shopping data generated by the shopping applications on the terminal devices 101, 102, 103.

The control server 104 may be a server that provides various services, such as a server that provides control services for storage services on the node servers 105, 106. The control server 104 may store various node related weight information. The control server 104 may receive a storage request including to-be-stored data sent by the terminal devices 101, 102, and 103, and store the to-be-stored data to the node servers based on the weight information of the node servers 105 and 106.

It should be noted that the method for storing data provided by some embodiments of the present disclosure is generally performed by the control server 104. Accordingly, the apparatus for storing data is generally disposed in the control server 104.

It should be understood that the number of terminal devices, networks, and servers in FIG. 1 is merely illustrative. Depending on the implementation needs, there may be any number of terminal devices, networks, and servers.

Figure 2:
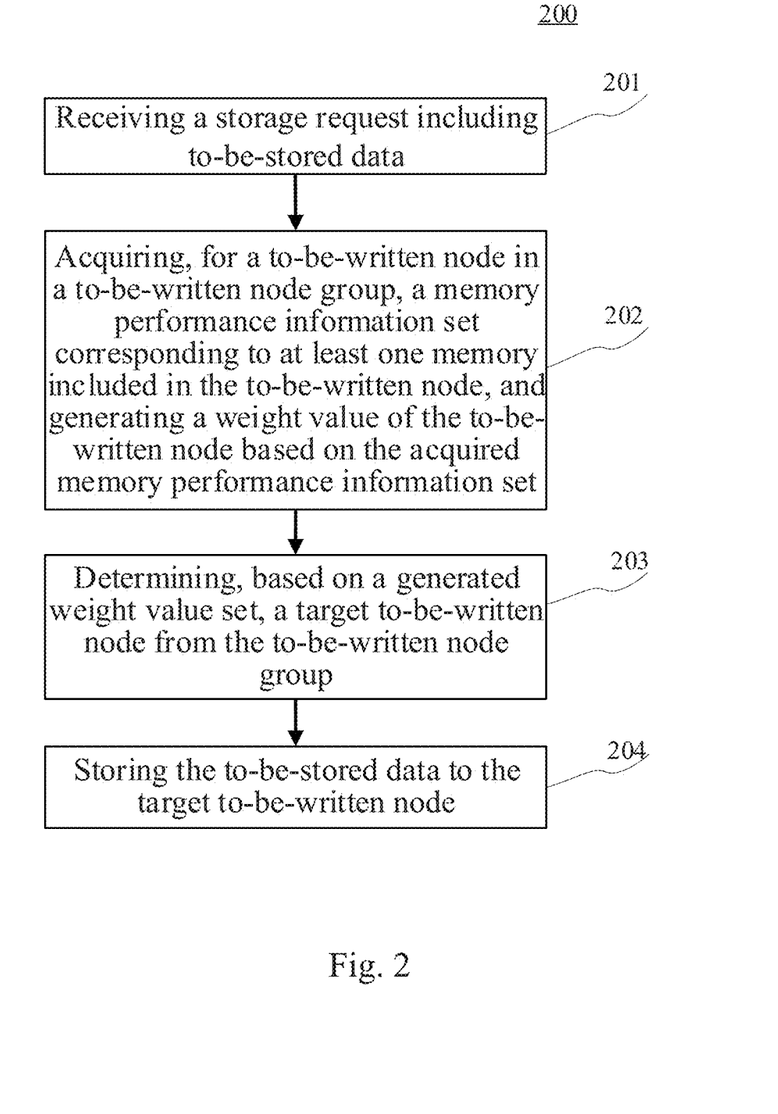
FIG. 2 is a flowchart of a method for storing data according to an embodiment of the present disclosure.

With further reference to FIG. 2, a flow 200 of a method for storing data according to an embodiment of the present disclosure is illustrated. The method for storing data includes the following steps.

Step 201, receiving a storage request including to-be-stored data.

In the present embodiment, an executing body of the method for storing data (for example, the control server 104 shown in FIG. 1) may receive a storage request including to-be-stored data sent by a terminal device in communication connection through a wired or wireless connection.

It should be noted that the to-be-stored data may be data in various formats. For example, the to-be-stored data may be data in a text format, data in a picture format, or data in an audio format. The storage request generally refers to any storage request issued by a terminal (such as the terminal devices 101, 102, 103 shown in FIG. 1) requesting storage of the to-be-stored data.

Step 202, acquiring, for a to-be-written node in a to-be-written node group, a memory performance information set corresponding to at least one memory included in the to-be-written node, and generating a weight value of the to-be-written node based on the acquired memory performance information set.

In the present embodiment, the to-be-written node generally refers to a server including a plurality of memories. The memory may be various storable medium such as a magnetic disk, or a flash memory, which is not limited herein. Memory performance information may generally include a read/write speed as well as disk remaining space. The read/write speed specifically refers to IOPS (Input/Output Per Second), that is, the amount of input and output per second (or the number of read/write times). If the memory is specifically a magnetic disk, the memory performance information may also include disk rotating speed, seek time, or the like.

It should be noted that the memory performance information set may be directly stored locally or may be stored in other electronic devices that are in communication connection with the executing body. If the memory performance information set is stored locally, the executing body may directly extract the locally stored memory performance information set for processing. If the memory performance information set is stored in other electronic devices in communication connection with the executing body, the executing body may acquire the memory performance information set for processing through a wired or wireless connection. The memory performance information may be processed through calculation according to an actually required algorithm step to generate a weight value of the to-be-written node.

In some alternative implementations of the present embodiment, the executing body may generate the weight value of the to-be-written node by the following steps: first, determine a remaining storage space level value and a read/write speed level value of the to-be-written node based on the acquired memory performance information set; then, generate the weight value of the to-be-written node based on the determined remaining storage space level value and the read/write speed level value. In the present embodiment, the determining the remaining storage space level value and the read/write speed level value of the to-be-written node generally refers to determining a normalized level value. Specifically, the remaining storage space level value may be obtained by grading according to a percentage of the remaining storage space included in the memory performance information. For example, if the percentage of the remaining storage space is between 70% and 80%, the remaining storage space level value is 2. Similarly, the read/write speed level value may be obtained by grading according to the read/write speed included in the memory performance information. For example, if the read/write speed is between 70 and 80, the read/write speed level value is 20. Then, the remaining storage space level value and the read/write speed level value may be processed through calculation according to a specified algorithm step to generate the weight value of the to-be-written node.

In some alternative implementations of the present embodiment, the executing body may also generate the weight value of the to-be-written node by the following steps: generating the weight value of the to-be-written node based on the determined remaining storage space level value and the read/write speed level value, and a preset weight value of the remaining storage space level value and a preset weight value of the read/write speed level value of the to-be-written node. In the present embodiment, the weight value of the remaining storage space level value generally refers to the weight used to adjust the remaining storage space level value. The weight value of the read/write speed level value generally refers to the weight used to adjust the read/write speed level value. The preset weight value of the remaining storage space level value and the preset weight value of the read/write speed level value of the to-be-written node may be set according to actual requirements, and are not limited herein. Generally, the remaining storage space level value and the read/write speed level value, and the acquired weight value of the remaining storage space level value and the weight value of the read/write speed level value of the to-be-written node may be processed through calculation according to an actually required algorithm step to generate the weight value of the to-be-written node. For example, the product of the remaining storage space level value and the read/write speed level value, the product of the remaining storage space level value and the weight value of the remaining storage space level value, and the product of the read/write speed level value and the weight value of the read/write speed level value are summed to generate the weight value of the to-be-written node.

Step 203, determining, based on a generated weight value set, a target to-be-written node from the to-be-written node group.

In the present embodiment, the generated weight value set refers to a weight value set composed of the weight values of the nodes generated in step 202. The target to-be-written node refers to a node to be selected by the executing body for storing the to-be-stored data. The selection of the node is generally selected based on the weight value of the node. Generally, the node with the larger weight value has a higher probability of being selected. For example, the node may be selected in order of weight value.

In some alternative implementations of the present embodiment, the step 203 includes: sorting weight values in the generated weight value set in a descending order to generate a weight value sequence, where the weight values in the weight value set have one-to-one corresponding relationships with to-be-written nodes in the to-be-written node group; grading, for the weight values in the generated weight value sequence, according to an equal spacing, the weight values to obtain level values corresponding to the weight values; and determining the target to-be-written node from the to-be-written node group based on the obtained level values. Generally, the node with the larger level value corresponding to the weight value has a higher probability of being selected. For example, the node may be selected in the order of the level value corresponding to the weight value.

Step 204, storing the to-be-stored data to the target to-be-written node.

In the present embodiment, the executing body may store the to-be-stored data in various methods. As an example, the executing body may store the to-be-stored data by means of wired communication, or may store the to-be-stored data by means of wireless communication.

The weight value of the node is determined in real time based on the memory performance information in the node, the node is selected to store the to-be-stored data based on the weight value of the node, so that the method may improve the flexibility of data storage.

Figure 3:
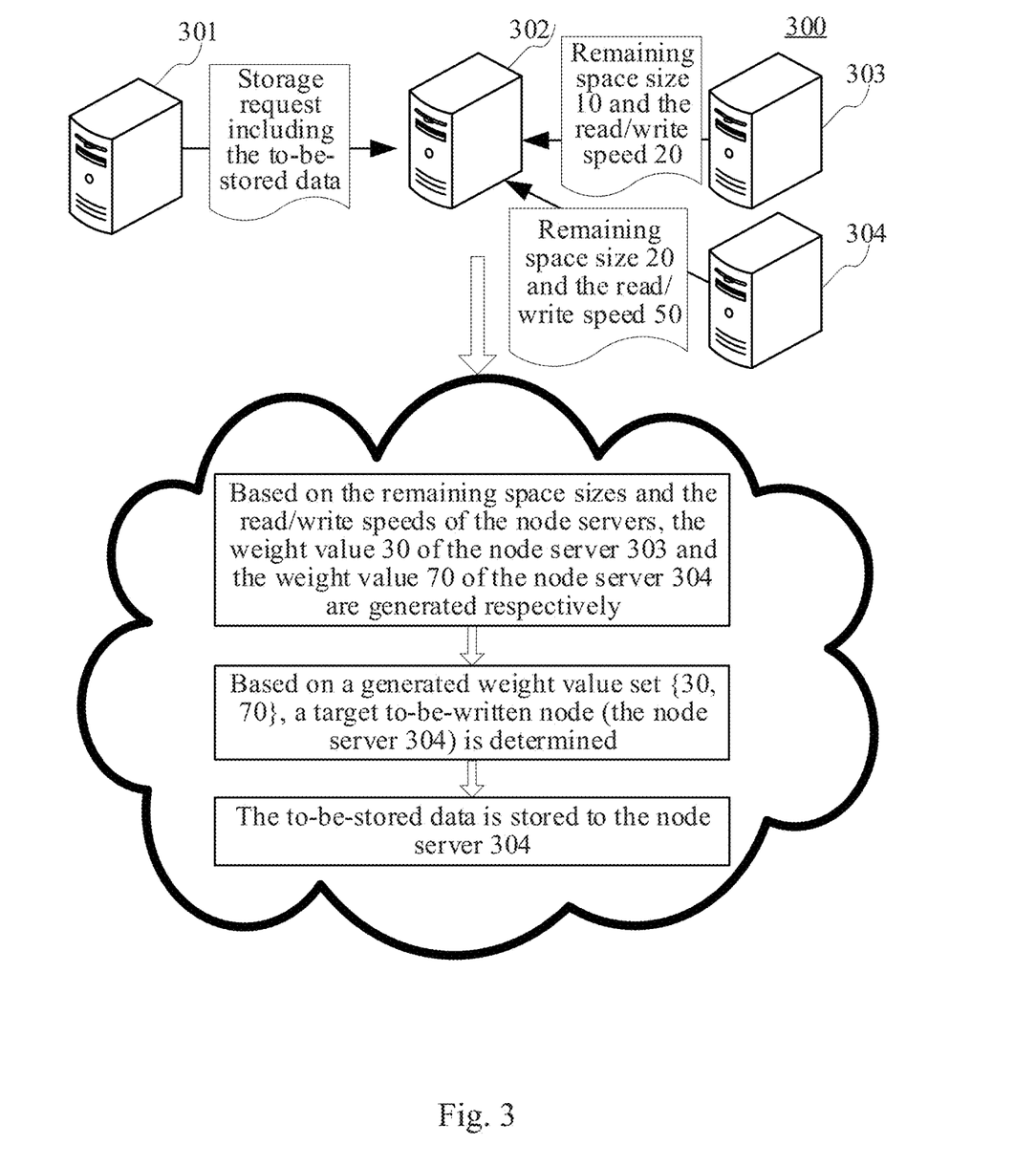
FIG. 3 is a schematic diagram of an application scenario of the method for storing data according to an embodiment of the present disclosure.

With further reference to FIG. 3, FIG. 3 is a schematic diagram of an application scenario of the method for storing data according to the present embodiment. In the application scenario 300 of FIG. 3, a terminal 301 where to-be-stored data is located is in communication connection with a control server 302. The control server 302 is in communication connection with node servers 303, 304. The control server 302 receives a storage request including the to-be-stored data. For the node server 303 of the node servers 303 and 304, the remaining space size 10 and the read/write speed 20 of five solid state disks included in the node server 303 are acquired. The weight value 30 of the node server 303 is generated based on the acquired remaining space size 10 and the read/write speed 20 of the five solid state disks. The remaining space size 20 and the read/write speed 50 of ten SATA (Serial ATA) hard disks included in the node server 304 of the node servers 303 and 304 are acquired. Based on the acquired remaining space size 20 and the read/write speed 50, the weight value 70 of the node server 304 is generated. Based on a generated weight value set {30, 70}, a target to-be-written node (the node server 304) is determined. The to-be-stored data is stored to the node server 304.

The method provided by some embodiments of the present disclosure first receives a storage request including to-be-stored data, then acquires, for a to-be-written node in a to-be-written node group, a memory performance information set corresponding to at least one memory included in the to-be-written node, and generates a weight value of the to-be-written node based on the acquired memory performance information set. Then, a target to-be-written node is determined from the to-be-written node group based on a generated weight value set. Finally, the to-be-stored data is stored to the target to-be-written node. The method improves the flexibility of data storage.

Figure 4:
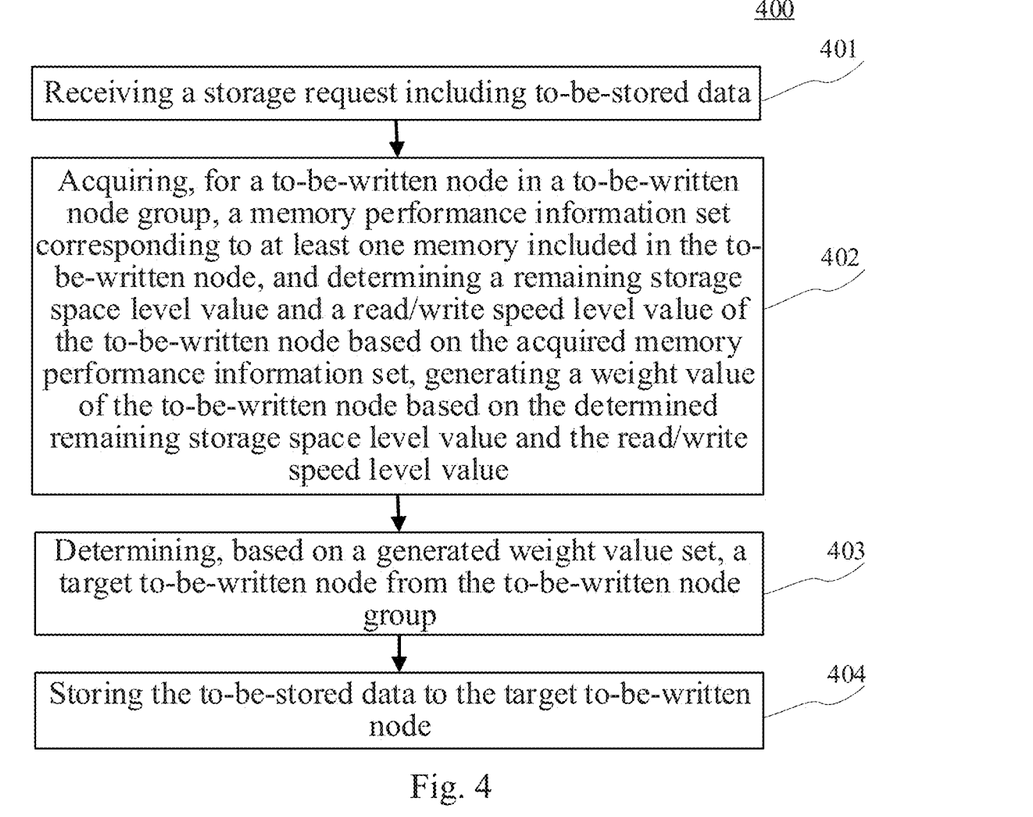
FIG. 4 is a flowchart of the method for storing data according to another embodiment of the present disclosure.

With further reference to FIG. 4, a flow 400 of another embodiment of the method for storing data is illustrated. The flow 400 of the method for storing data includes the following steps.

Step 401, receiving a storage request including to-be-stored data.

Step 402, acquiring, for a to-be-written node in a to-be-written node group, a memory performance information set corresponding to at least one memory included in the to-be-written node, and determining a remaining storage space level value and a read/write speed level value of the to-be-written node based on the acquired memory performance information set, generating a weight value of the to-be-written node based on the determined remaining storage space level value and the read/write speed level value.

In the present embodiment, the to-be-written node generally refers to a server including a plurality of memories. The memory may be various storable medium such as a magnetic disk, or a flash memory, which is not limited herein. Memory performance information may generally include a read/write speed as well as disk remaining space. The read/write speed specifically refers to IOPS (Input/Output Per Second), that is, the amount of input and output per second (or the number of read/write times). If the memory is specifically a magnetic disk, the memory performance information may also include disk rotating speed, seek time, or the like.

It should be noted that the memory performance information set may be directly stored locally or may be stored in other electronic devices that are in communication connection with the executing body. If the memory performance information set is stored locally, the executing body may directly extract the locally stored memory performance information set for processing. If the memory performance information set is stored in other electronic devices in communication connection with the executing body, the executing body may acquire the memory performance information set for processing through a wired or wireless connection. The memory performance information may be processed through calculation according to an actually required algorithm step to generate a weight value of the to-be-written node.

In the present embodiment, the determining the remaining storage space level value and the read/write speed level value of the to-be-written node generally refers to determining a normalized level value. Specifically, the remaining storage space level value may be obtained by grading according to a percentage of the remaining storage space included in the memory performance information. For example, if the percentage of the remaining storage space is between 70% and 80%, the remaining storage space level value is 2. Similarly, the read/write speed level value may be obtained by grading according to the read/write speed included in the memory performance information. For example, if the read/write speed is between 70 and 80, the read/write speed level value is 20. Typically, the remaining storage space level value and the read/write speed level value may be processed through calculation according to a specified algorithm step to generate the weight value of the to-be-written node.

Step 403, determining, based on a generated weight value set, a target to-be-written node from the to-be-written node group.

Step 404, storing the to-be-stored data to the target to-be-written node.

The above steps 401, 403, and 404 may be executed in a method similar to the steps 201, 203, and 204 of the embodiment shown in FIG. 2, and detailed description thereof will be omitted.

As can be seen from FIG. 4, the flow 400 of the method for storing data in the present embodiment reflects the step of determining the remaining storage space level value and the read/write speed level value of the to-be-written node based on the memory performance information set, and the step of generating the weight value of the to-be-written node, as compared with the embodiment corresponding to FIG. 2. Thus, the solution described in the present embodiment may facilitate the flexible use of the memory performance information set to generate the weight value of the node.

Figure 5:
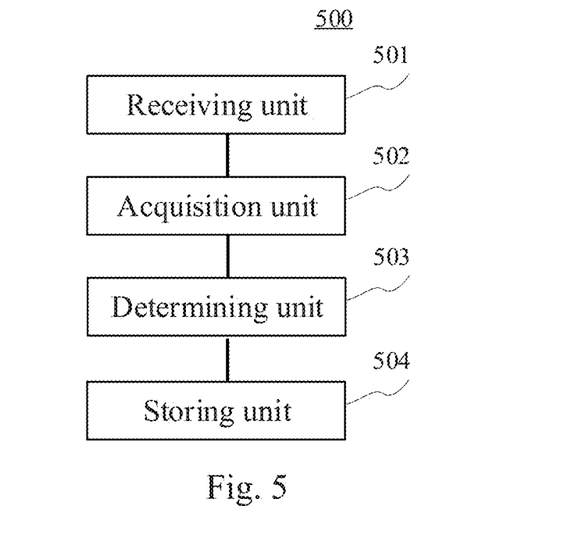
FIG. 5 is a schematic structural diagram of an apparatus for storing data according to an embodiment of the present disclosure.

With further reference to FIG. 5, as an implementation of the method shown in the above figures, some embodiments of the present disclosure provides an embodiment of an apparatus for storing data, and the apparatus embodiment may correspond to the method embodiment as shown in FIG. 2, and the apparatus maybe specifically applied to various electronic devices.

As shown in FIG. 5, the apparatus 500 for storing data of the present embodiment includes: a receiving unit 501, configured to receive a storage request including to-be-stored data. An acquisition unit 502 is configured to acquire, for a to-be-written node in a to-be-written node group, a memory performance information set corresponding to at least one memory included in the to-be-written node, and generate a weight value of the to-be-written node based on the acquired memory performance information set. A determining unit 503 is configured to determine, based on a generated weight value set, a target to-be-written node from the to-be-written node group. A storing unit 504 is configured to store the to-be-stored data to the target to-be-written node.

In the present embodiment, the specific processing and the technical effects thereof of the receiving unit 501, the acquisition unit 502, the determining unit 503, and the storing unit 504 in the apparatus 500 for storing data may be respectively referred to the related descriptions of step 201, step 202, step 203 and step 204 in the corresponding embodiment in FIG. 2, and detailed description thereof will be omitted.

In the apparatus provided by some embodiments of the present disclosure, the receiving unit 501 receives a storage request including to-be-stored data, the acquisition unit 502 acquires a memory performance information set, and generates a weight value of the to-be-written node based on the acquired memory performance information set, the determining unit 503 determines a target to-be-written node from the to-be-written node group based on a generated weight value set, and the storing unit 504 stores the to-be-stored data to the target to-be-written node. The apparatus improves the flexibility of data storage.

Figure 6:
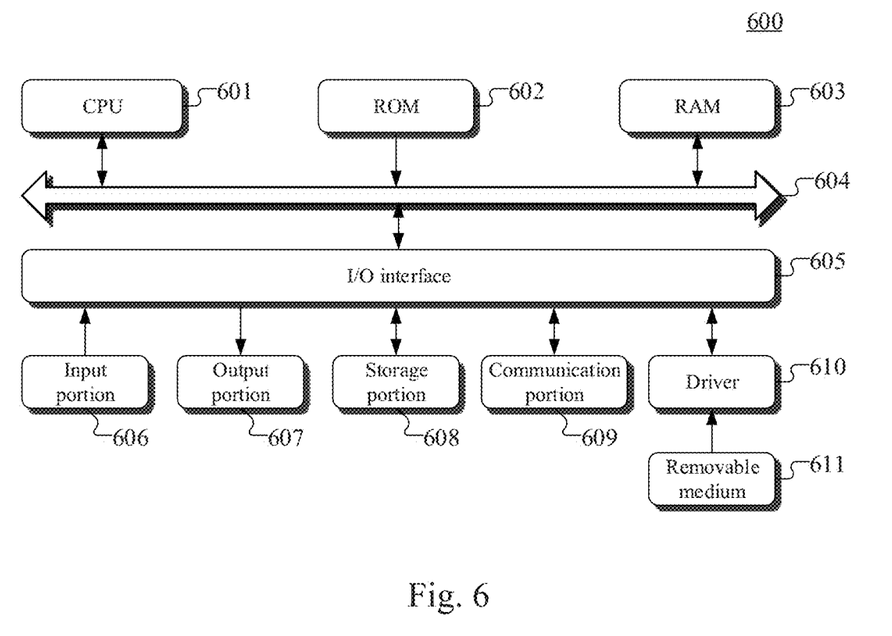
FIG. 6 is a schematic structural diagram of a computer system adapted to implement a server of some embodiments of the present disclosure.

With further reference to FIG. 6, a schematic structural diagram of a computer system. 600 adapted to implement a server of some embodiments of the present disclosure is shown. The server shown in FIG. 6 is merely an example, and should not impose any limitation on the function and scope of use of some embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse, etc.; an output portion 607 including such as a cathode ray tube (CRT), a liquid crystal display device (LCD), a speaker, etc.; a storage portion 608 including a hard disk or the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to some embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 609, and/or may be installed from the removable medium 611. The computer program, when executed by the central processing unit (CPU) 601, implements the above mentioned functionalities as defined by the methods of some embodiments of the present disclosure. It should be noted that the computer readable medium in some embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In some embodiments of the present disclosure, the computer readable storage medium may be any physical medium containing or storing programs which may be used by a command execution system, apparatus or element or incorporated thereto. In some embodiments of the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in some embodiments of the present disclosure maybe implemented by means of software or hardware. The described units may also be provided in a processor, for example, maybe described as: a processor including a receiving unit, an acquisition unit, a determining unit and a storing unit. Here, the names of these units do not in some cases constitute limitations to such units themselves. For example, the receiving unit may also be described as "a unit for receiving a storage request including to-be-stored data".

In another aspect, some embodiments of the present disclosure further provide a computer readable medium. The computer readable medium may be included in the apparatus in the above described embodiments, or a stand-alone computer readable medium not assembled into the apparatus. The computer readable medium carries one or more programs. The one or more programs, when executed by the apparatus, cause the apparatus to: receive a storage request including to-be-stored data; acquire, for a to-be-written node in a to-be-written node group, a memory performance information set corresponding to at least one memory included in the to-be-written node, and generate a weight value of the to-be-written node based on the acquired memory performance information set; determine, based on a generated weight value set, a target to-be-written node from the to-be-written node group; and store the to-be-stored data to the target to-be-written node.

The above description only provides an explanation of embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for storing data, the method comprising:
receiving a storage request comprising to-be-stored data;
acquiring, for a to-be-written node in a to-be-written node group, a memory performance information set corresponding to at least one memory comprised in the to-be-written node, wherein the memory performance information set comprises a remaining storage space size in the to-be-written node and a read/write speed of the to-be-written node;
determining a remaining storage space level value and a read/write speed level value of the to-be-written node through normalization and grading based on the acquired memory performance information set, wherein the normalization and grading refers to classifying the remaining storage space size in to-be-written data into a level in a plurality of remaining storage space levels and classifying the read/write speed of the to-be-written node into a level in a plurality of read/write speed levels, each level in the plurality of remaining storage space levels corresponds to a remaining storage space size range and each level in the plurality of read/write speed levels corresponds to a read/write speed range, and each level is assigned a level value;
generating a weight value of the to-be-written node by summing a product of the determined remaining storage space level value and the read/write speed level value of the to-be-written node, a product of the remaining storage space level value and a preset weight value of the remaining storage space level value, and a product of the read/write speed level value and a preset weight value of the read/write speed level value;
determining, based on a generated weight value set, a target to-be-written node from the to-be-written node group; and
storing the to-be-stored data to the target to-be-written node.

2. The method according to claim 1, wherein the memory performance information further comprises at least one of: a rotating speed of the memory, and seek time.

3. The method according to claim 1, wherein determining, based on the generated weight value set, the target to-be-written node from the to-be-written node group, comprises:
sorting weight values in the generated weight value set in a descending order to generate a weight value sequence, wherein the weight values in the generated weight value set have one-to-one corresponding relationships with to-be-written nodes in the to-be-written node group;
grading, for the weight values in the generated weight value sequence, according to a set level spacing, the weight values to obtain level values corresponding to the weight values; and
determining the target to-be-written node from the to-be-written node group based on the obtained level values.

4. An apparatus for storing data, the apparatus comprising:
at least one processor; and
a memory storing instructions, the instructions when executed by the at least one processor, cause the at least one processor to perform operations, the operations comprising:
receiving a storage request comprising to-be-stored data;
acquiring, for a to-be-written node in a to-be-written node group, a memory performance information set corresponding to at least one memory comprised in the to-be-written node, wherein the memory performance information set comprises a remaining storage space size in the to-be-written node and a read/write speed of the to-be-written node;
determining a remaining storage space level value and a read/write speed level value of the to-be-written node through normalization and grading based on the acquired memory performance information set, wherein the normalization and grading refers to classifying the remaining storage space size in to-be-written data into a level in a plurality of remaining storage space levels and classifying the read/write speed of the to-be-written node into a level in a plurality of read/write speed levels, each level in the plurality of remaining storage space levels corresponds to a remaining storage space size range and each level in the plurality of read/write speed levels corresponds to a read/write speed range, and each level is assigned a level value;
generating a weight value of the to-be-written node by summing a product of the determined remaining storage space level value and the read/write speed level value of the to-be-written node, a product of the remaining storage space level value and a preset weight value of the remaining storage space level value, and a product of the read/write speed level value and a preset weight value of the read/write speed level value;

determining, based on a generated weight value set, a target to-be-written node from the to-be-written node group; and storing the to-be-stored data to the target to-be-written node.

5. The apparatus according to claim 4, wherein the memory performance information further comprises at least one of: a rotating speed of the memory of the to-be-written node, or seek time.

6. The apparatus according to claim 4, wherein determining, based on the generated weight value set, the target to-be-written node from the to-be-written node group, comprises:

sorting weight values in the generated weight value set in a descending order to generate a weight value sequence, wherein the weight values in the generated weight value set have one-to-one corresponding relationships with to-be-written nodes in the to-be-written node group;

grading, for the weight values in the generated weight value sequence, according to a set level spacing, the weight values to obtain level values corresponding to the weight values; and determining the target to-be-written node from the to-be-written node group based on the obtained level values.

7. A non-transitory computer readable medium, storing a computer program thereon, the computer program, when executed by a processor, causes the processor to perform operations, the operations comprising:

receiving a storage request comprising to-be-stored data;

acquiring, for a to-be-written node in a to-be-written node group, a memory performance information set corresponding to at least one memory comprised in the to-be-written node, wherein the memory performance information set comprises a remaining storage space size in the to-be-written node and a read/write speed of the to-be-written node;

determining a remaining storage space level value and a read/write speed level value of the to-be-written node through normalization and grading based on the acquired memory performance information set, wherein the normalization and grading refers to classifying the remaining storage space size in to-be-written data into a level in a plurality of remaining storage space levels and classifying the read/write speed of the to-be-written node into a level in a plurality of read/write speed levels, each level in the plurality of remaining storage space levels corresponds to a remaining storage space size range and each level in the plurality of read/write speed levels corresponds to a read/write speed range, and each level is assigned a level value;

generating a weight value of the to-be-written node by summing a product of the determined remaining storage space level value and the read/write speed level value of the to-be-written node, a product of the remaining storage space level value and a preset weight value of the remaining storage space level value, and a product of the read/write speed level value and a preset weight value of the read/write speed level value;

determining, based on a generated weight value set, a target to-be-written node from the to-be-written node group; and storing the to-be-stored data to the target to-be-written node.

\* \* \* \* \*